United States Patent [19]

Byers

[11] 4,312,030

[45] Jan. 19, 1982

[54] SWITCHING WAVEFORM SYNTHESISER FOR POLYPHASE STATIC INVERTERS

[76] Inventor: David J. Byers, Univ. of Canterbury, Christchurch, New Zealand

[21] Appl. No.: 72,614

[22] Filed: Sep. 5, 1979

Related U.S. Application Data

[63] Continuation-in-part of Ser. No. 880,353, Feb. 23, 1978, abandoned.

[30] Foreign Application Priority Data

Feb. 16, 1977 [NZ] New Zealand .................. 183352

[51] Int. Cl.³ .................. H02M 1/08; H02P 13/18
[52] U.S. Cl. .................. 363/41; 318/811
[58] Field of Search .............. 318/807, 809, 810, 811; 363/39–42, 136, 137

[56] References Cited

U.S. PATENT DOCUMENTS

| | | | |
|---|---|---|---|
| 3,538,420 | 11/1970 | Klein | 363/42 |
| 3,694,718 | 9/1972 | Graf et al. | 363/137 |
| 3,697,843 | 10/1972 | Riess | 363/137 |
| 3,947,736 | 3/1976 | Byers | 318/811 |
| 3,967,173 | 6/1976 | Stich | 318/811 |
| 3,971,972 | 7/1976 | Stich | 318/811 |
| 4,123,692 | 10/1978 | Gilmore et al. | 318/311 |

*Primary Examiner*—William H. Beha, Jr.
*Attorney, Agent, or Firm*—Holman & Stern

[57] ABSTRACT

Switching waveform generator for pulse width modulation triggering of static inverters producing variable frequency output. The number of chops per half-cycle of output fundamental frequency is decreased as fundamental frequency is increased so as to keep the switching frequency of the inverter within the capabilities of the power switching devices used while obtaining maximum harmonic suppression. The chop number is changed between sequential frequency ranges. In a preferred form the chop width is continuously varied as output frequency is varied to decrease output amplitude with decreasing frequency to enable constant torque operation of an induction motor load.

8 Claims, 14 Drawing Figures

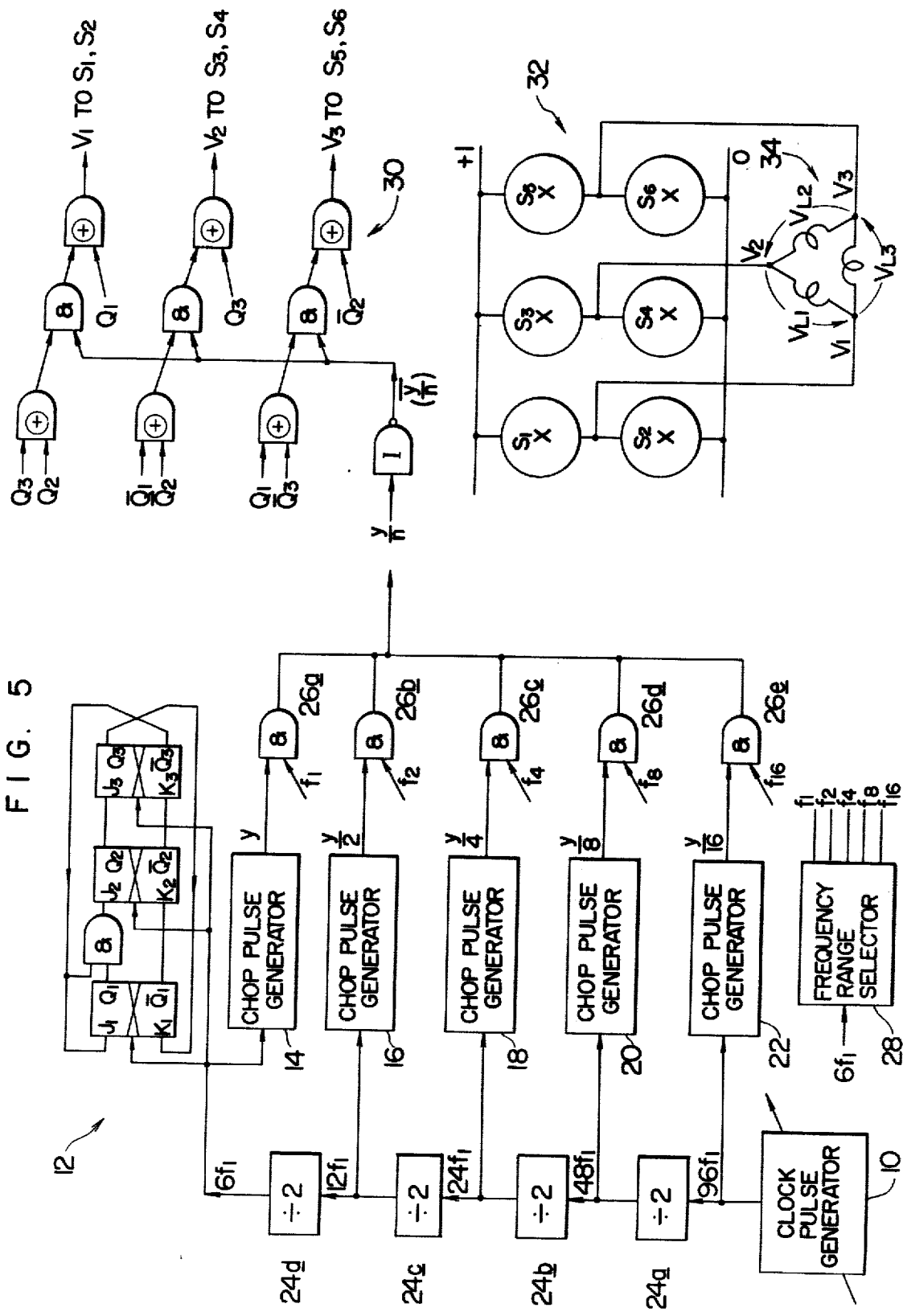
F I G. 5

| cycle segment | $0-\frac{T}{6}$ | $\frac{T}{6}-\frac{T}{3}$ | $\frac{T}{3}-\frac{T}{2}$ | $\frac{T}{2}-\frac{2T}{3}$ | $\frac{2T}{3}-\frac{5T}{6}$ | $\frac{5T}{6}-T$ |
|---|---|---|---|---|---|---|
| inverter switches closed | S5 S4 S1 | S4 S1 S6 | S1 S6 S3 | S6 S3 S2 | S3 S2 S5 | S2 S5 S4 |

SWITCHING WAVEFORM SYNTHESISER FOR POLYPHASE STATIC INVERTERS

RELATED APPLICATIONS

This application is a continuation-in-part of application Ser. No. 880,353 filed Feb. 23, 1978, now abandoned.

BACKGROUND OF THE INVENTION

This invention relates to switching waveform synthesisers for producing trigger waveforms for variable frequency poly-phase static inverters.

Three-phase pulse width modulation inverter drives rely on a balanced three-phase load, usually an induction motor, to act as an integrating filer and to minimize undesirable harmonics in the line currents as much as possible. Since inverter output waveforms exhibit half-wave symmetry, even order harmonics are not present in the waveforms and since they form a balanced three-phase system, integer multiples of third harmonic line voltage frequencies are likewise absent. The positive sequence harmonic components of the inverter line voltages applied to a three-phase induction motor load are given by 6K-5, for K integer but not zero. Likewise, the negative and zero sequence harmonics are given by GK-1 and 6K-3 respectively, for K integer but not zero. Since the latter group of harmonics are all integer multiples of the third harmonic frequency in a balanced three-phase load, zero sequence harmonic amplitudes are always zero, and only positive and negative sequence harmonic amplitudes exist in the three-phase load.

In U.S. Pat. No. 3,947,736 it has been described how the effective line voltage amplitudes of a balanced three-phase load may be varied by chopping the square wave phase waveforms with a variable width chopping pulse, applied between T/6 and T/3 and also between 2/3 T and 5T/6 of the inverter output phase voltage period, as shown in FIG. 1. Each wave period, T, is assumed to be measured from the instant of transition from the lower to the higher level of the square wave phase waveform. $V_1$, $V_2$ and $V_3$ represent the chopped, three-phase voltage output waveforms and $V_{L1}$, $V_{L2}$ and $V_{L3}$ represent the resulant balanced, three-phase line voltage output waveforms. The most significant, low order, relative harmonic amplitudes of the line voltages are shown in FIG. 2 as the duration of the single chopping pulse is altered from 0 (0% chop) to T/6 (100% chop) within the above stated chopping ranges. It can be seen that low order harmonic amplitudes rapidly approach those of the fundamental as the chop increases from 0% to 100%. However if multiple, rather than single, chopping is used an improvement is obtained. This is illustrated in FIG. 3 which shows the more significant, low order, relative harmonic amplitudes of the line voltages when the single chopping pulse (duration y) is replaced by four equally spaced chops each of duration Y/4, within the above stated chopping ranges.

A detailed study of waveform harmonics, such as those shown in FIGS. 2 and 3, reveals that the predominant line voltage harmonics applied to the balanced three-phase load (other than the fundamental) occur in pairs and a negative sequence harmonic component is always balanced by a positive sequence harmonic component. If n is the number of equally spaced voltage control chops per inverter phase half-cycle which are applied between the previously stated ranges of T/6 and T/3 and also ⅔T and 5T/6 of the phase waveform period, then these predominant harmonic pairs are given by $6Kn \pm 1$, for K integer but not zero. For this reason, current harmonics do not markedly affect the torque produced by a thre-0hae induction motor load, but do contribute to undesirable power losses in the motor. To reduce the amplitudes of predominant harmonic currents as much as possible in the integrating filter formed by the balanced three-phase load, it is desirable to make n as large as possible.

Practical limits to the value of n exist. One practical limit to the value of n is imposed by the maximum switching frequency of the static inverter switching devices, which will usually be silicon controlled rectifiers. Since the switching frquency of an inverter SCR switched by these waveforms is $(2n+1)$ times the inverter fundamental frequency, a value of n suitable at low frequencies would cause the inverter SCRs to exceed their maximum switching frequency limit at higher frequencies.

SUMMARY OF THE INVENTION

It is an object of the present invention to provide a switching waveform synthesiser for triggering a polyphase static inverter which produces an optimum reduction of harmonics compatible with the switching capabilities of the static inverter.

Accordingly the invention consists in a switching waveform synthesiser for triggering a poly-phase static inverter which produces a pulse width modulated waveform the output of which when integrated approximates a sinusoidal system the amplitude of which varies as the system frequency is varied. A variable frequency poly-phase square wave generator produces a set of unchopped square waves of the desired period. Chop pulses are produced by a series of n pulse generators which each produce a waveform consisting of a series of fixed duration pulses, each generator in the series producing a greater number of pulses per phase square wave half-cycle than the preceding generator by a predetermined factor but said pulses being of a lesser duration than the pulses produced by the preceding generator by the predetermined factor. Selection means select the output from one of said pulse generators and a logical inverter derives the logical complement of the selected waveform. Logic circuitry associated with the square wave generator enables the logical inverter output for a predetermined fraction of each square wave half-cycle for each phase, and a mixing or chopping means chop each phase square wave with the output from this logic circuitry to produce static inverter trigger waveforms. The generator selection means is under the control of means which cause the first generator output to be selected when the frequency of the square wave generator is within a high range of frequencies, the second generator output to be selected when said frequency is within an adjacent range of lower frequencies, the selection process continuing as the frequency of the square wave generator decreases through adjacent frequency ranges until the nth generator is selected.

BRIEF DESCRIPTION OF THE DRAWINGS

FIG. 5 is a circuit diagram of a switching waveform synthesiser which varies the number of trigger waveform chopping pulses as the inverter frequency is varied through five frequency ranges.

In the synthesiser of the invention, the number of equally spaced voltage control chops per inverter phase half-cycle, n, is switched to progressively lower integer values in a type of "electronic gear change" as the frequency increased. Since an inductive three-phase load acts better as an integrating filter as the input frequency is increased, reduction in the value of n in this way provides acceptable load input voltage waveform without excessive inverter switching rate and thus excessive inverter switching losses.

To illustrate the effect of this electronic gear change, Table 1 sets out the first predominant harmonic pair, the highest inverter fundamental frequency and the voltage chop pulse width for n equally spaced voltage chops per half cycle within previously stated ranges, for an SCR maximum switching frequency of 400 Hz and for a voltage chop effective up to 100 Hz.

TABLE 1

| | Electronic Gear Changes | | | |
|---|---|---|---|---|
| | First predominant harmonic pair | | | |
| No. of chops (n) | Negative sequence (6n − 1) | Positive sequence (6n + 1) | Highest fundamental frequency $\frac{400}{(2n + 1)}$ | Voltage chop $\frac{y}{(n)}$ |
| 16 | 95th | 97th | 12.1 Hz | 104 μsec |
| 8 | 47th | 49th | 23.5 Hz | 208 μsec |
| 4 | 23rd | 25th | 44.4 Hz | 417 μsec |
| 2 | 11th | 13th | 80.0 Hz | 833 μsec |

TABLE 1-continued

| | Electronic Gear Changes | | | |
|---|---|---|---|---|
| | First predominant harmonic pair | | | |
| No. of chops (n) | Negative sequence (6n − 1) | Positive sequence (6n + 1) | Highest fundamental frequency $\frac{400}{(2n + 1)}$ | Voltage chop $\frac{y}{(n)}$ |
| 1 | 5th | 7th | 133 Hz* | 1.67 msec |

*Limited to 100 Hz by chop width

Figure 1:
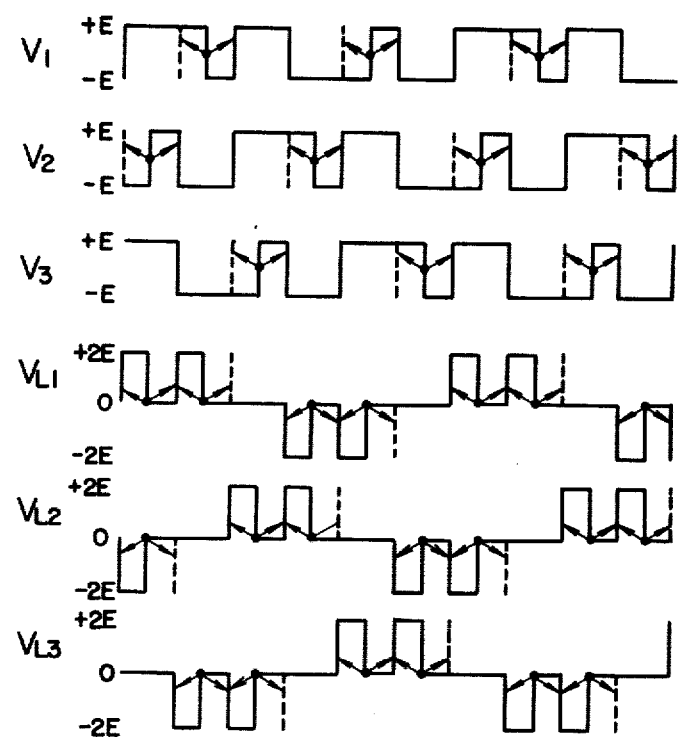
FIG. 1 is a diagram of triggering waveforms for a pulse width modulated three-phase inverter, $V_1$, $V_2$, $V_3$ and corresponding line voltage waveforms $V_{L1}$, $V_{L2}$, $V_{L3}$.
Figure 2:
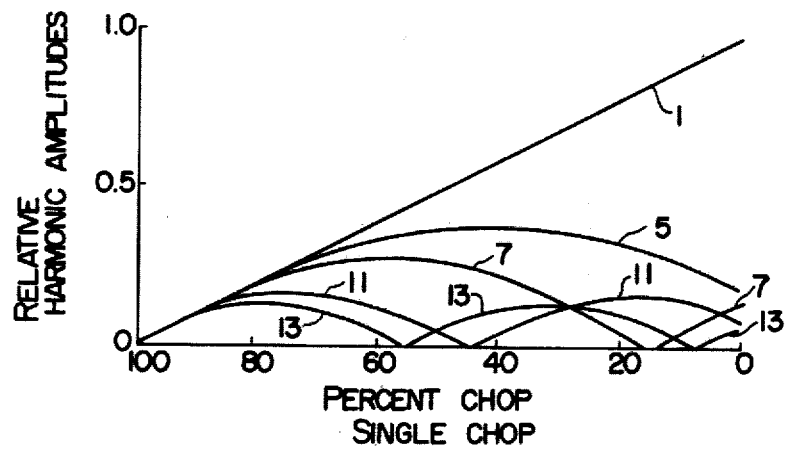
FIG. 2 is a graph of relative harmonic content in the inverter line voltages across chop pulse width when the trigger waveforms are chopped using a single chopping pulse per phase half-cycle as in FIG. 1.
Figure 3:
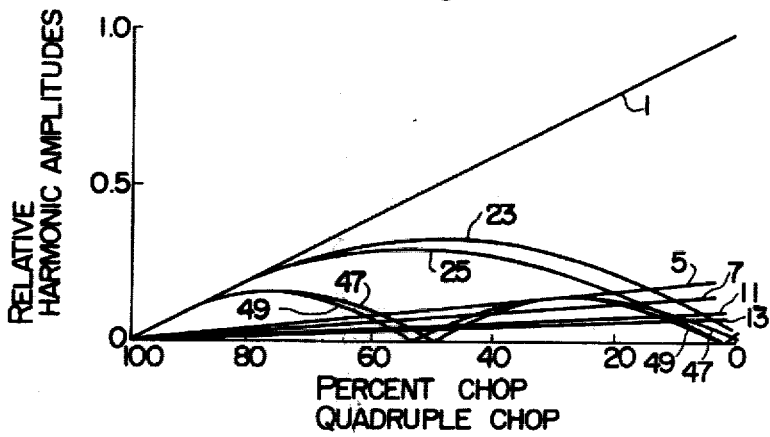
FIG. 3 is a graph of relative harmonic content in the inverter line voltages against chop pulse width when the trigger waveforms are chopped using four chopping pulses per phase half-cycle.
Figure 4:
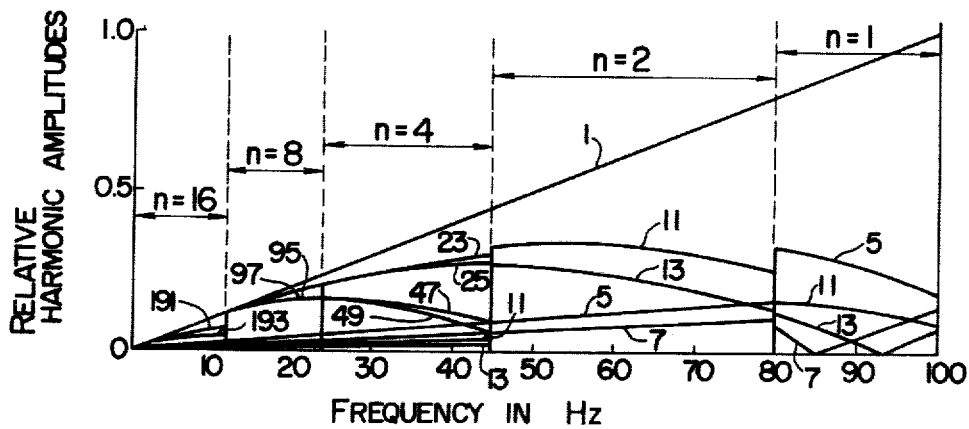
FIG. 4 is a graph of relative harmonic content in the inverter line voltages against chop pulse width when the number of trigger waveform chopping pulses per phase half-cycle is increased in multiples of two as the inverter frequency is reduced through five frequency ranges.

FIG. 4 illustrates the predominant, low order, harmonic content of the inverter line voltages when the electronic gear change of Table 1 is employed and the amplitude of the line voltage fundamental is decreased linearly with frquency. This latter feature is necessary where the inverter load is an AC motor since for constant torque operation it is necessary to maintain approximately constant magnetising current in the motor windings. The linear decrease in fundamental line voltage amplitude with frequency is achieved by using y (logical inverse or complement or NOT y) chop as described and claimed in U.S. Pat. No. 3,947,736.

Figure 8:
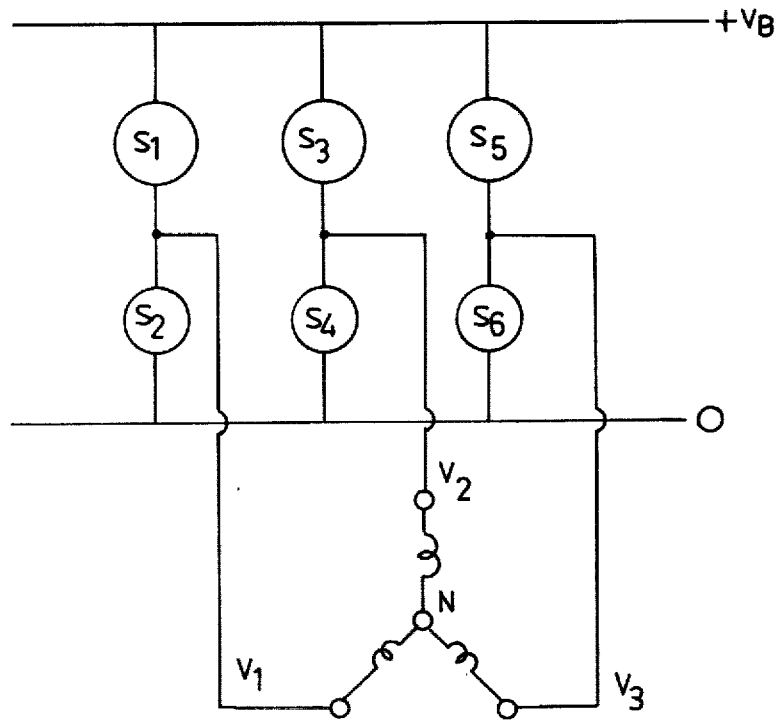
FIG. 8 is a block diagram of an inverter and Y-connected load configuration.
Figure 9:
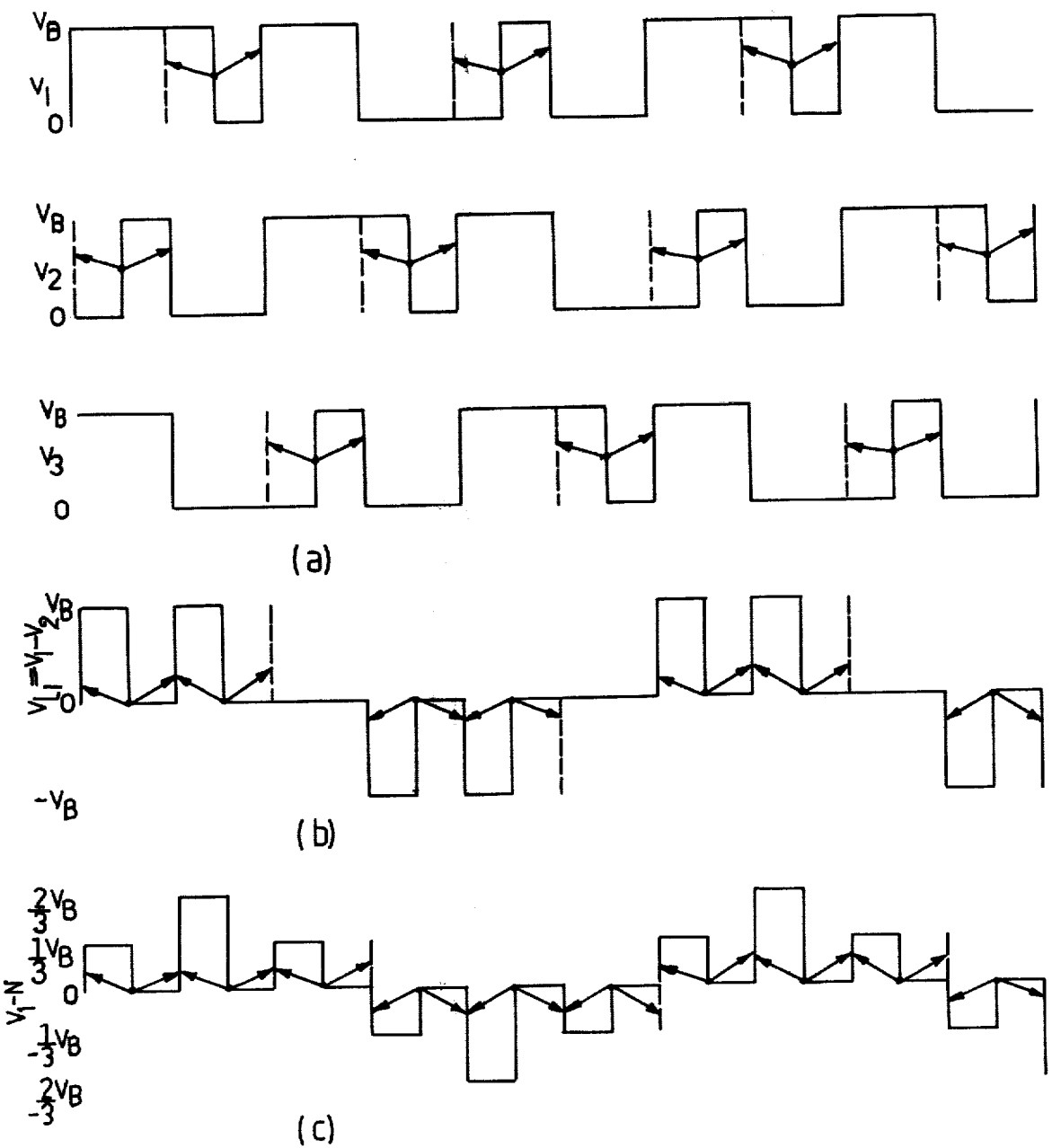
FIG. 9a is a diagram of triggering waveforms for a pulse width modulated three-phase inverter.
FIG. 9b is a diagram of the corresponding line voltage waveform $V_{L1}$ corresponding to the triggering waveform $V_1$ in FIG. 9a, FIG. 9c is a timing diagram of the phase voltage waveform corresponding to line 1 in a single chop per inverter phase half cycle.
Figure 10:
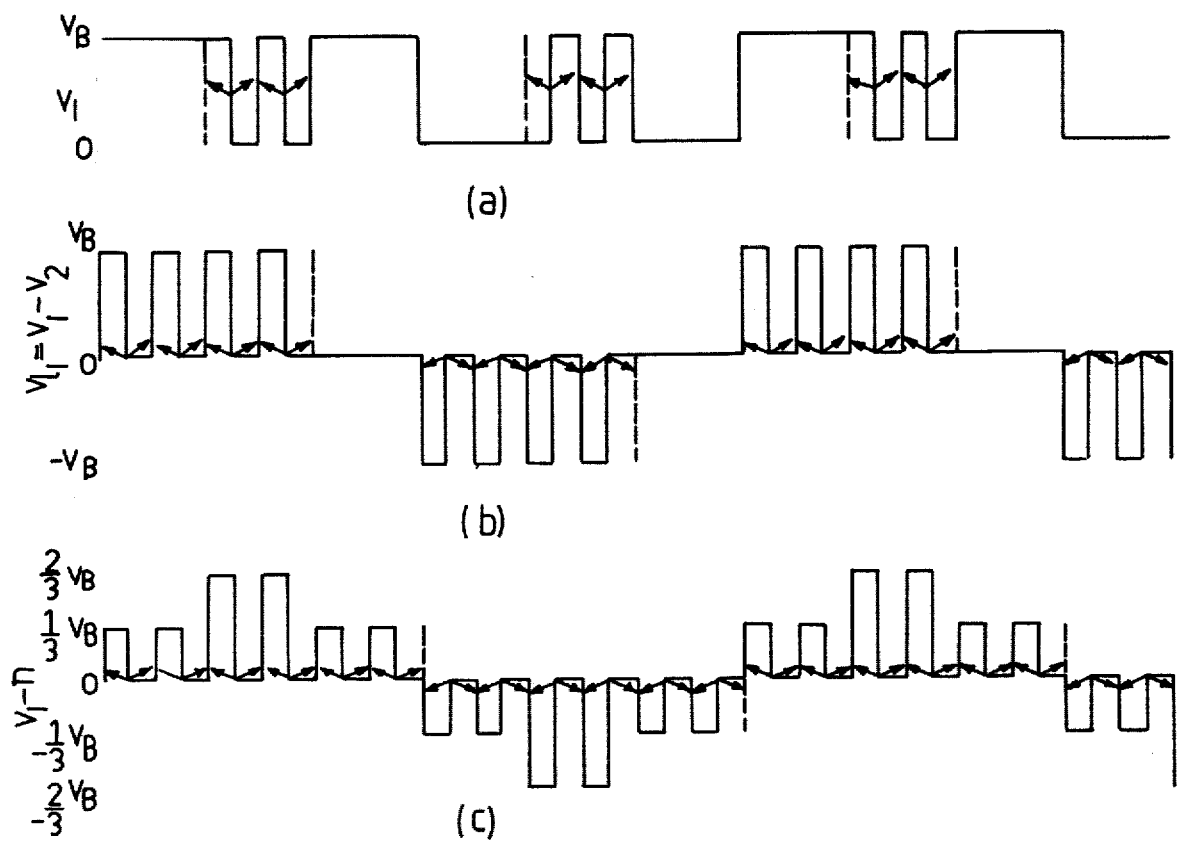
FIGS. 10a, 10b and 10c are timing diagrams showing the effect on inverter and load voltages of introducing two chops per inverter phase half cycle.

The information represented graphically in FIG. 4 is also illustrated in a qualitative manner from the load voltage waveforms for a given number of chops per phase half cycle. FIG. 9a illustrates the inverter output voltage waveforms for a single chop per phase half cycle in the inverter and Y-connected load (motor) configuration of FIG. 8. FIGS. 9b and 9c show typical load line voltage and phase voltage waveforms, respectively, for a single chop per inverter phase half cycle. FIG. 10 illustrates the effect on inverter and load voltages of introducing two chops per inverter phase half cycle, each chop being half the width of the chops used wherein only a single chop is made per inverter phase half cycle. The chops lie symmetrically within the same T/6 inverter phase half cycle as is the case where only a single chop per half cycle is made. It will be appreciated that the motor phase voltage shown in FIG. 10c more closely approximates a sinusoid than the equivalent voltage shown in FIG. 9c. Increasing improvement is achieved as the number of chops per half cycle, n, is increased beyond two.

A waveform synthesiser incorporating the abovementioned electronic gear change is shown in block diagram form in FIG. 5, and constitutes a modification to the synthesiser of U.S. Pat. No. 3,947,736. Three phase square waves are generated in a switchtail or twisted ring counter, 12, which is protected against unwanted switching sequences and is clocked by a variable frequency clock pulse generator, 10. These waveforms are chopped in the manner described in U.S. Pat. No. 3,947,736 by logic circuitry, 30, before being used to switch a static inverter, 32, which has a balanced three-phase integrating, filter load such as a three-phase induction motor, 34. The chopping pulse period for each phase is selected by channelling the inverted pulse y̅ through AND gates 16a, 16b, and 16c which are "opened" or "enabled" by signals from the EXCLUSIVE-OR gates 18a, 18b, and 18c, as shown. The latter EXCLUSIVE-OR gates are fed with signals from the ring counter 12 as shown in the Figure, such that the AND gates are enabled in correct sequence twice during each period for each phase. The channelled y̅ pulses from the AND gates 16 are then mixed with the three-phase square waves $Q_1$, $Q_3$, $\overline{Q}_2$ in EXCLUSIVE-OR gates 20a, 20b, and 20c respectively.

The chop pulse generator 14 produces a fixed period pulse y at regular intervals, six times every square wave period T. The period y is adjusted to be of duration $T_{MIN}/6$ where $T_{MIN}$ is the period of the highest frequency waveform at which voltage control is to be effective. For the previously discussed example, since voltage control is to be effective up to 100 Hz, y has value 1.67 m S as shown in Table 1. Likewise, chop pulse generator 16 produces a fixed period pulse of duration y/2 at regular intervals twelve times each period; chop pulse generator 18 produces a fixed period pulse of duration y/4 at regular intervals twenty-four times each period; chop pulse generator 20 produces a fixed period pulse duration y/8 at regular intervals forty-eight times each period and chop pulse generator 22 produces a fixed period pulse of duration y/16 at regular intervals ninety-six times each period. This series could be extended or contracted if warranted. Synchronism with switchings of the three-phase square wave generator 12 is obtained by dividing down the output frequency of the clock pulse generator 10, using a divider shown diagramatically as a chain of divide-by-two counters 24 a to 24 d.

Figure 7:
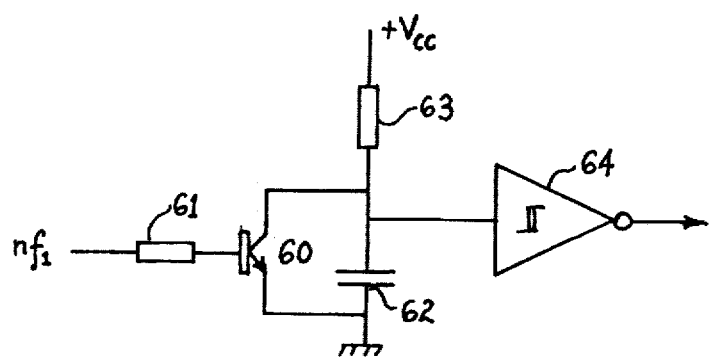
FIG. 7 is a circuit diagram of a chop pulse generator for the waveform synthesiser of FIG. 5.

Monostable multivibrators can be used to form the chop pulse generators 14 to 22. A monostable multivibrator circuit which produces a fixed duration pulse completely independent of the frequency of the trigger pulses is illustrated in FIG. 7. Trigger pulses $nf_1$ are applied to the base of transistor 60 through a series resistor 61. The emitter collector circuit of transistor 60 is connected in parallel with a capacitor 62 which together with resistor 63, forms a series connected RC circuit. Thus prior to the presence of a trigger pulse, transistor 60 is OFF and capacitor 62 is charged through resistor 63 which is connected to a positive voltage rail. Upon the occurrence of a trigger pulse to the base of transistor 60, transistor 60 turns on and short circuits capacitor 62 thereby discharging it. On termination of the trigger pulse, transistor 62 is charged exponentially by current flowing from resistor 63. Connected to the junction of resistor 63 and capacitor 62 is a schmitt trigger (which may for convenience be one of a number of schmitt trigger NAND gates contained on a common chip) which changes state upon the voltage at the junction of capacitor 62 and 63 reaching a predetermined value. The output of the schmitt trigger 64 is thus a positive pulse with a width determined by the RC circuit time constant and the threshold voltage of the schmitt trigger 64. With such a circuit the occurrence of a trigger pulse while the monostable circuit is in the "unstable" state is effective, the capacitor 62 being discharged and the charging cycle caused to start again at the termination of the trigger pulse.

Only one output of the series of chop pulse generators is used at any instant. Selection of the required chop pulse generator output is shown diagramatically as being through the AND gate chain 26 a to 26 e, only one of which is enabled at any one time by an output from a frequency range selector 28. Outputs from the enabling gates 26 a to 26 e inclusive are shown "wire-OR" connected, but if this facility is not possible with the type of logic gates used, an effective multi-input OR gate may be used instead of the connection shown. The selected chop pulses of duration y/n are inverted and the "NOT y/n" chopping pulses are modulated on to the three phase waveforms by the final gates of logic circuitry 30 twice during every waveform period within the ranges T/6 to T/3 and 2T/3 to 5T/6. Since y/n is a fixed duration pulse, the duration of "NOT y/n" increases automatically between the specified range limits as the waveform period T increases so that the three phase inverter output line voltages automatically decrease with frequency below the preset maximum frequency.

Only one output of the frequency range selector 28 may be high at one time and switching between one output and another occurs coincident with the clocking of the twisted ring counter 12. As already discussed in the example given, at very low frequencies output $f_{16}$ is high and n=16, but when the inverter switching sequency reaches the maximum permitted, the "high" output switches to $f_8$ so that n=8, then pregressively as the waveform frequency increases, the "high" output switches to $f_4$ (when n=4), $f_2$ (when n=2) and finally to $f_1$ (when n=1). At frequencies above the maximum frequency at which voltage control ceases, (i.e. outside the constant torque operating mode), "NOT y/n" is always zero, so that the three phase voltage waveforms $Q_1$, $Q_3$ and $\overline{Q}_2$ emerge from the modulation gates 30 unchopped and thus unchanged. To ensure clean, positive and jitterfree switching between the outputs of the frequency range selector 28, the switching is regenerative and has hysterisis in its input-output characteristic so that indecisive switching is eliminated.

Figure 6:
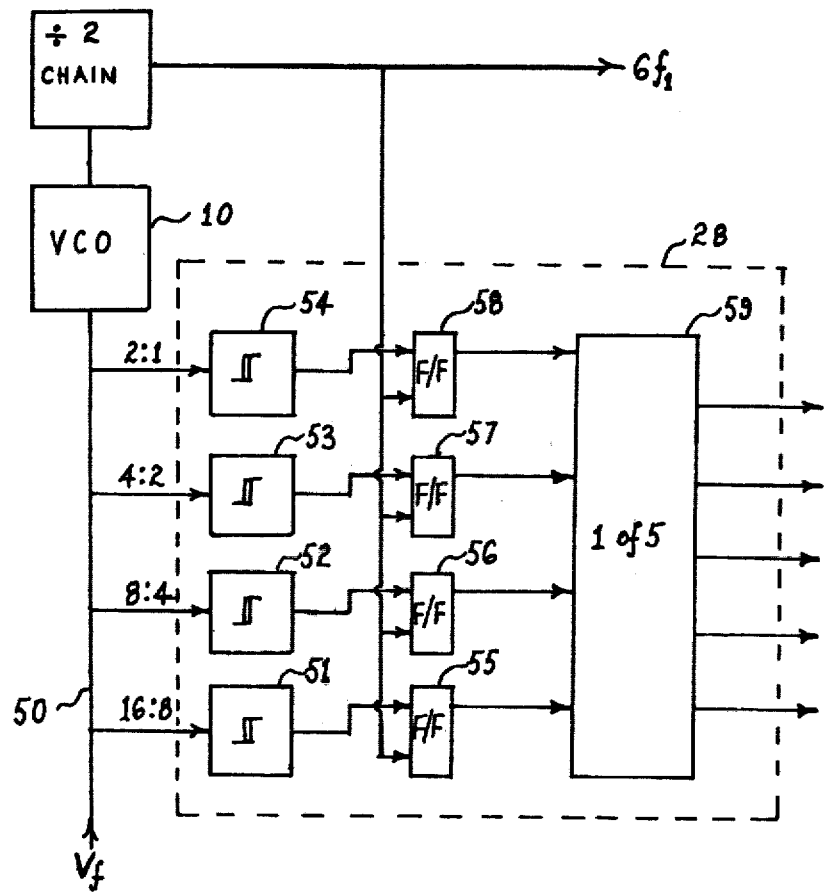
FIG. 6 is a circuit diagram of a chopping pulse generator selector for use with the waveform synthesiser of FIG. 5.

One form by which the frequency selector 28 may be implemented is shown in FIG. 6. The variable frequency clock pulse generator 10 (FIG. 5) is a voltage controlled oscillator, the output frequency being directly proportional to an input direct voltage. In FIG. 6 the voltage controlling the frequency of clock pulse generator 10 is carried by conductor 50. As well as supplying oscillator 10, conductor 50 supplies each of four analogue comparators 51, 52, 53 and 54. Each comparator is arranged to change state at a direct voltage on conductor 50 which corresponds to one of the four boundary frequencies of the five operating frequency ranges already mentioned. Thus as the frequency of oscillator 10 is increased, comparator 51 is first triggered and subsequently comparators 52, 53 and 54 with continuing increase in frequency. Associated with respective comparators are flip-flops 55, 56, 57 and 58 which receive as one input, the output of the corresponding comparator and as the other input clock pulse frequency $6f_1$. The flip-flops 55 to 58 perform the function of delaying the comparator change of state until the next following transition in signal $6f_1$. The flip-flop outputs feed a "one out of five" decoder 59, the five decoder outputs being signals $f_1$ to $f_{16}$ as designated in FIG. 5. That is, for a given frequency range of oscillator 10, only one output of the decoder 59 is active at any one time and accordingly the chop pulses from only one generator (FIG. 5) are gated through to the chopping circuitry 30 during any given frequency range.

I claim:

1. A switching waveform synthesiser for triggering a poly-phase static inverter which produces a pulse width modulated waveform the output of which when integrated approximates a sinusoidal system the amplitude of which varies as the system frequency is varied comprising:
   a variable frequency poly-phase square wave generator, a series of n edge-triggered monostable pulse generators which each produce a waveform consisting of a series of fixed duration pulses, means for triggering each monostable pulse generator at a multiple of the frequency of said square wave generator, each monostable pulse generator in the series producing a greater number of pulses per phase square wave half-cycle than the preceding generator by a predetermined factor but said pulses being of a lesser duration than the pulses produced by the preceding generator by said predetermined factor, means which select the output from one of said monostable pulse generators, a logical inverter fed from said selection means, logic circuitry associated with the square wave generator which enables the logical inverter output for a predetermined fraction of each square wave half-cycle for each phase, means which mix or chop each phase square wave with the output from said logic circuitry to produce the static inverter trigger waveforms, and means controlling said monostable pulse generator selection means which cause the first generator output to be selected when the frequency of the square wave generator is within a high range of frequencies, the second generator output to be selected when said frequency is within an adjacent range of lower frequencies, the selection process continuing as the frequency of the square wave generator decreases through adjacent frequency ranges until the $n^{th}$ generator is selected.

2. A switching waveform synthesiser according to claim 1 wherein the first pulse generator of said series produces one pulse at least once each square wave half-cycle for each phase, the second generator produces two pulses each of half the duration of that produced by the first generator at least once each square wave half-cycle for each phase, the third generator produces four pulses each of one quarter the duration of that produced by the first generator at least once each square wave half cycle for each phase, and so on.

3. A switching waveform synthesiser according to claim 1 wherein said poly-phase square wave generator is a three-phase generator comprising a variable frequency clock pulse generator, and a three flip-flop twisted ring counter triggered by the clock pulse generator output, the phase square waves being taken from appropriate flip-flop outputs.

4. A switching waveform synthesiser according to claim 3 wherein said clock pulse generator comprises a variable frequency oscillator and a series of digital dividers in cascade, the oscillator output clocking the last pulse generator in the series, the output of the first divider clocking the penultimate pulse generator in the series, and so on.

5. A switching waveform synthesiser according to claim 4 wherein each digital divider of said clock pulse generator divides by a factor of two.

6. A switching waveform synthesiser according to claim 5 wherein the output of the final divider in said clock pulse generator clocks both the twisted ring counter and the first pulse generator in said series.

7. A switching waveform synthesiser according to claim 3 wherein said clock pulse generator is a direct voltage controlled oscillator, wherein said means for controlling the generator selection means includes n - 1 voltage comparators each receiving as an input the direct voltage controlling said oscillator and each set to trigger at a voltage value corresponding to a respective boundary frequency between adjacent frequency ranges, and a one out of n decoder to which the outputs of the n - 1 comparators are connected, and wherein said generator selection means comprise a gate in series with each of the n pulse generator outputs, the gate outputs being OR connected, each individual gate enabling input being connected to a corresponding one of the n outputs of said decoder, and the OR gate output supplying the selected pulse generator output.

8. A three-phase variable speed AC motor drive comprising in combination a switching waveform synthesiser according to claim 1 and a static inverter triggered by said switching waveform synthesiser.

* * * * *